(12) United States Patent
Phillip et al.

(10) Patent No.: US 8,754,349 B2
(45) Date of Patent: Jun. 17, 2014

(54) PLASMA TORCH CUTTING DEVICE AND PROCESS

(71) Applicant: Kiffer Industries Inc., Cleveland, OH (US)

(72) Inventors: Dale C. Phillip, Westlake, OH (US); James P. Muckley, Strongsville, OH (US)

(73) Assignee: Kiffer Industries Inc., Cleveland, OH (US)

( * ) Notice: Subject to any disclaimer, the term of this patent is extended or adjusted under 35 U.S.C. 154(b) by 0 days.

(21) Appl. No.: 13/796,459

(22) Filed: Mar. 12, 2013

(65) Prior Publication Data

US 2013/0186870 A1 Jul. 25, 2013

Related U.S. Application Data

(63) Continuation of application No. 12/791,441, filed on Jun. 1, 2010, now Pat. No. 8,395,075.

(60) Provisional application No. 61/275,524, filed on Aug. 31, 2009, provisional application No. 61/217,361, filed on May 29, 2009.

(51) Int. Cl.
*B23K 9/00* (2006.01)
*B23K 9/02* (2006.01)

(52) U.S. Cl.
USPC .................................................. 219/121.44

(58) Field of Classification Search
USPC ............. 219/121.59, 121.39, 121.48, 121.82, 219/121.52, 121.5, 121.45, 75, 219/130.31–130.33, 121.54, 121.55, 219/121.57, 121.44, 121.6
See application file for complete search history.

(56) References Cited

U.S. PATENT DOCUMENTS

| | | | |
|---|---|---|---|
| 5,198,039 A | 3/1993 | Rogers | |
| 5,256,212 A | 10/1993 | Magnuson | |
| 5,708,251 A * | 1/1998 | Naveh | 219/121.66 |
| 5,866,872 A | 2/1999 | Lu et al. | |
| 5,989,485 A | 11/1999 | Staacks et al. | |
| 6,218,639 B1 | 4/2001 | Bulle | |
| 6,249,718 B1 * | 6/2001 | Gilliland et al. | 700/255 |

(Continued)

OTHER PUBLICATIONS

Messer Cutting Systems: TMC4500 ST Heavy-Duty Cutting System, Apr. 2008.

*Primary Examiner* — Dao H Nguyen
*Assistant Examiner* — Tram H Nguyen
(74) *Attorney, Agent, or Firm* — Wegman, Hessler & Vanderburg

(57) ABSTRACT

A method of operating a plasma arc torch system includes placing a work piece to be cut on a table of the plasma arc torch system, wherein at least a portion of the work piece has a planer surface facing away from the table. A plasma arc torch is positioned adjacent the planer surface of the work piece using a positioning apparatus, wherein the positioning apparatus has at least five degrees of freedom about which it can move the plasma arc torch relative the work piece for cutting the work piece on the table. The method further includes angling the torch relative the planer surface of the work piece such that the torch is held at an angle of between about 1 and about 4 degrees from perpendicular with the planer surface to back burn a produced kerf such that a kerf edge is perpendicular relative the planer surface of the work piece. Additionally, the planer surface of the work piece is calculated by contacting the work piece with the torch at least three times.

15 Claims, 3 Drawing Sheets

(56) References Cited

U.S. PATENT DOCUMENTS

| | | |
|---|---|---|
| 6,274,841 B1 | 8/2001 | Ramakrishnan et al. |
| 6,469,274 B1 | 10/2002 | Delzenne et al. |
| 6,740,844 B2 | 5/2004 | Rossi |
| 6,761,776 B2 | 7/2004 | Bowlin et al. |
| 6,772,040 B1 | 8/2004 | Picard et al. |
| 6,900,408 B2 | 5/2005 | Picard et al. |
| 7,022,935 B1 | 4/2006 | Matus et al. |
| 7,067,762 B2 | 6/2006 | Yamaguchi et al. |
| 7,071,441 B1 | 7/2006 | Bulle |
| 7,074,360 B2 | 7/2006 | Wolven |
| 7,161,111 B2 | 1/2007 | Schneider |
| 7,375,303 B2 | 5/2008 | Twarog |
| 7,560,659 B2 * | 7/2009 | Menin ............. 219/121.64 |
| 7,615,720 B2 | 11/2009 | Sanders |
| 8,153,927 B2 | 4/2012 | Twarog et al. |
| 2002/0046999 A1 * | 4/2002 | Veikkolainen et al. .. 219/124.34 |
| 2003/0000928 A1 | 1/2003 | Forlong |
| 2006/0049159 A1 * | 3/2006 | Nihei et al. ............. 219/137.9 |
| 2007/0023887 A1 | 2/2007 | Matsui |
| 2012/0298632 A1 * | 11/2012 | Riemann et al. ......... 219/121.44 |

* cited by examiner

PLASMA TORCH CUTTING DEVICE AND PROCESS

CROSS REFERENCE TO RELATED APPLICATIONS

This application claims the priority benefit of U.S. Provisional Patent Application Ser. No. 61/217,361 filed May 29, 2009 and U.S. Provisional Patent Application Ser. No. 61/275,524 filed Aug. 31, 2009. This application is a continuation application and claims the priority benefit of U.S. Pat. No. 8,395,075 that issued on Mar. 12, 2013.

BACKGROUND OF THE INVENTION

1. Field of Invention

The present invention relates generally to plasma arc torch cutting machines and, in particular, relates to a positioning apparatus for positioning the torch.

2. Description of Related Art

Plasma arc torches are widely used for cutting metallic materials and can be employed in automated systems for automatically processing a work piece. The system may include the plasma arc torch, an associated power supply, a positioning apparatus, and an associated computerized numeric controller (CNC). At least one of the plasma arc torch and the work piece may be mounted on the positioning apparatus, which provides relative motion between the tip of the torch and the work piece to direct the plasma arc along a processing path.

The plasma arc torch generally includes a torch body, an electrode mounted within the body, passages for cooling and arc control fluids, a swirl ring to control the fluid flow patterns, a nozzle with a central exit orifice, electrical connections, and a power supply. The torch produces the plasma arc, which is a constricted ionized jet of a plasma gas with high temperature and high momentum. A shield may also be employed on the tip of the torch to protect the nozzle and to provide a shield gas flow to the area proximate the plasma arc. Gases used in the torch can be non-reactive (e.g., argon or nitrogen), or reactive (e.g., oxygen or air).

The power supply provides the electrical current necessary to generate the plasma arc. The power supply has one or more dc power modules to produce a constant current for the torch. Typically, the current can be set to discreet values. The power supply has a microprocessor, which regulates essentially all plasma system functions, including start sequence, CNC interface functions, gas and cut parameters, and shut off sequences. For example, the microprocessor can ramp-up or ramp-down the electrical current. The main on and off switch of the power supply can be controlled locally or remotely by the CNC. The power supply also powers a cooling system for cooling the torch.

The CNC communicates with the positioning apparatus to direct the motion of the torch to enable the work piece to be cut to a desired pattern. However, with some cut geometries, such as circles, prior art positioning systems that control the torch only in mutually orthogonal X, Y, and Z-axes produce a kerf that ends up being uneven as a small portion of the metal remains Additionally, at times, it would be desired to cut the work piece with a bevel shaped edge. Therefore, there is a strong need to provide an improved positioning apparatus for a plasma torch system that enables the operator to better control the positioning of the torch to compensate for the angle of the side of the kerf or to provide a selected bevel cut.

SUMMARY OF THE INVENTION

The invention is directed to an improved plasma arc torch system for cutting a work piece. The system includes a table for receiving the work piece and a plasma arc torch for cutting the work piece. The system also includes a positioning apparatus for controlling the position and orientation of the cutting torch with respect to the work piece W on the table, wherein the positioning apparatus having five degrees of freedom about which it can move the plasma arc torch relative the work piece. In one embodiment, the plasma arc torch system has an overlaying gantry with a traveling beam disposed so as to traverse the table and a carriage mounted on the traveling beam on which the plasma torch is mounted. The traveling beam is movable along a first axis which extends in a longitudinal direction by an X-axis motor, and the carriage is movable along a second axis by operation of a Y-axis motor, and the carriage is movable by operation of mechanical slider connected to a Z-axis motor for movement in along a third axis which extends in a vertical direction relative to the table to move the plasma torch to a desired position on the table to cut the work piece, wherein the first, second and third axes are mutually orthogonal. The system also includes a turret mounted to the carriage, wherein the turret permits the torch to rotate about two different axes so that it can be tilted at an angle relative the mutually orthogonal first, second and third axes, wherein the turret contains a first pivot mount having a boom extending therefrom, and a second pivot mount on a distal end of the boom, wherein the plasma arc torch is mounted on the second pivot mount.

The invention is also directed to a method of operating a plasma arc torch system. The method includes placing a work piece to be cut on a table of the plasma arc torch system, wherein at least a portion of the work piece has a planer surface facing away from the table. A plasma arc torch is positioned adjacent the planer surface of the work piece using a positioning apparatus, wherein the positioning apparatus has at least five degrees of freedom about which it can move the plasma arc torch relative the work piece for cutting the work piece on the table. The method further includes angling the torch relative the planer surface of the work piece such that the torch is held at an angle of between about 1 and about 4 degrees from perpendicular with the planer surface to back burn a produced kerf such that a kerf edge is perpendicular relative the planer surface of the work piece. Additionally, the method includes calculating the planer surface of the work piece by contacting the work piece with the torch at least three times.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
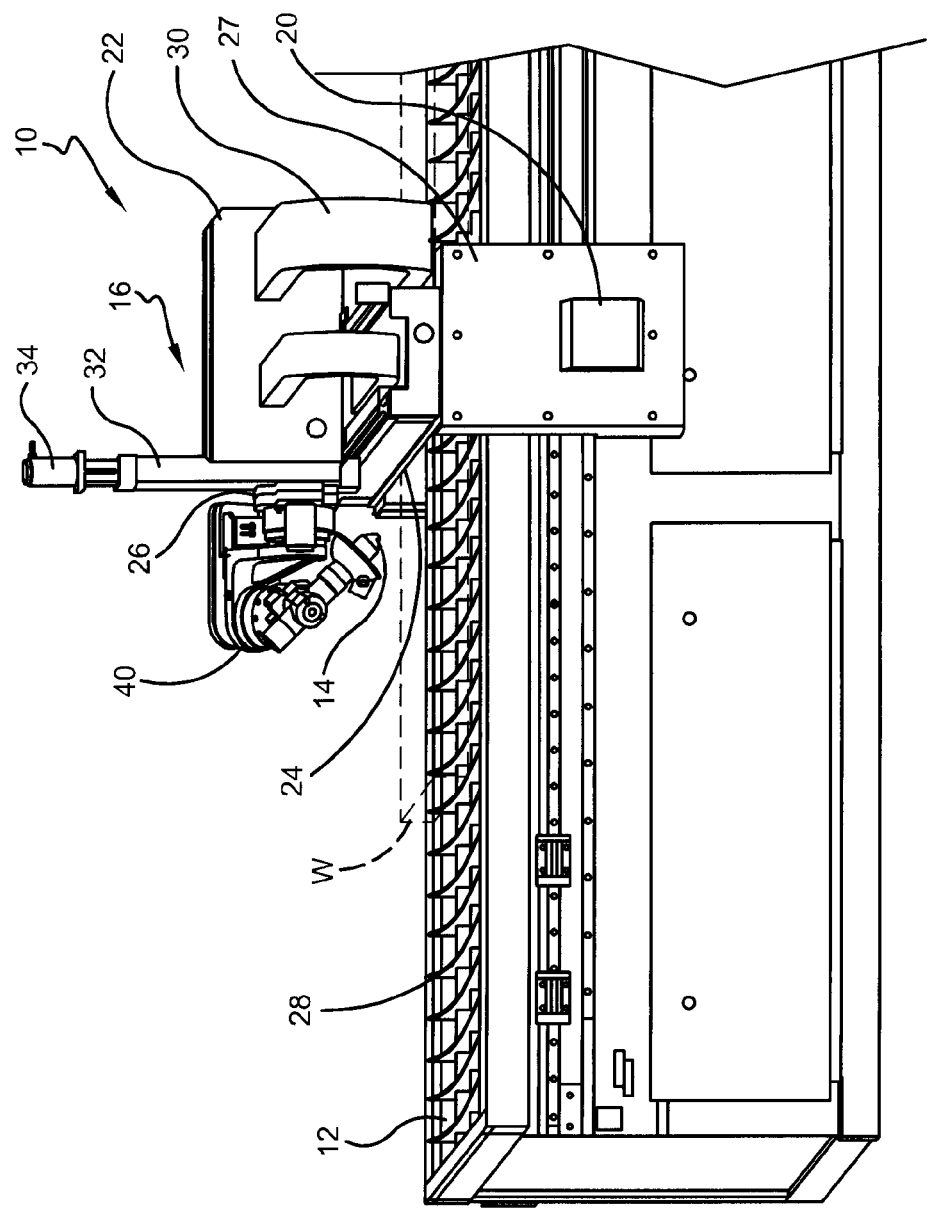
FIG. 1 is a perspective view of a plasma arc torch system in accordance with an exemplary embodiment of the invention.

Referring now to the drawings, FIG. 1 illustrates a plasma arc torch system 10 in accordance with an exemplary embodiment of the present invention. The invention will be described using the plasma arc torch system 10, however, one skilled in the art will understand that the invention may also be used on other cutting systems such as oxyfuel gas cutting systems or laser cutting systems without departing from the scope of the invention. The system 10 includes a generally planar table 12 for receiving a work piece W, a plasma arc torch 14 and a positioning apparatus 16 for controlling the position and orientation of the cutting torch 14 with respect to the work piece W on the table 12. The torch 14 may be of any suitable conventional or special design, such as a dual gas plasma cutting torch. Although a detailed illustration of the plasma arc torch 14 is omitted herein, it should be noted that plasma torches use a superheated stream of ionized gas issued at high velocity to cut a stock material and the high temperature discharge from the torch for cutting the work piece W is generally referred to as a "flame." An electrode is connected, through a torch cable for supplying plasma current, to one terminal (minus terminal) of a plasma power source unit and the other terminal (plus terminal) of the plasma power source unit is connected to the work piece W through a parent material cable. The circuit for the work piece W diverges and is then connected to a nozzle through a resister and an on-off switch. Attached to the leading end (serving as a plasma arc generating point) of the electrode is a heat-resistant insert made from a high melting point material (e.g., hafnium, zirconium and alloys) which can withstand the high heat of the plasma arc. Plasma arc torches are well known in the industry and need not be described in further detail herein. A control station 20 is mounted adjacent the table 12 to provide the positioning apparatus 16 with position control. The control station contains a suitable computerized numeric controller (CNC) 21.

According to the invention, the positioning apparatus 16 has five degrees of freedom about which it can move the plasma arc torch 14 relative the work piece W. The positioning apparatus 16 includes an overlaying gantry 22 with a traveling beam 24 disposed so as to traverse the table 12. Disposed on the traveling beam 24 is a carriage 26 on which the plasma torch 14 is mounted. The traveling beam 24 is movable by operation of an X-axis motor 27 in the direction of the X-axis along an X-axis rail 28, which extends in a longitudinal direction (i.e., the X-axis direction) of the table 12. The carriage 26 is movable by operation of a Y-axis motor 30 in the direction of the Y-axis along a Y-axis rail 32 disposed on the traveling beam 24. The carriage is movable by operation of mechanical slider 33 connected to a Z-axis motor 34 for movement in a vertical direction (i.e., the Z-axis direction) relative to the table 12. By controlling each motor 27, 30, 34, the plasma torch 14 is moved to a desired position on the table 12 to cut the work piece W.

Figure 2:
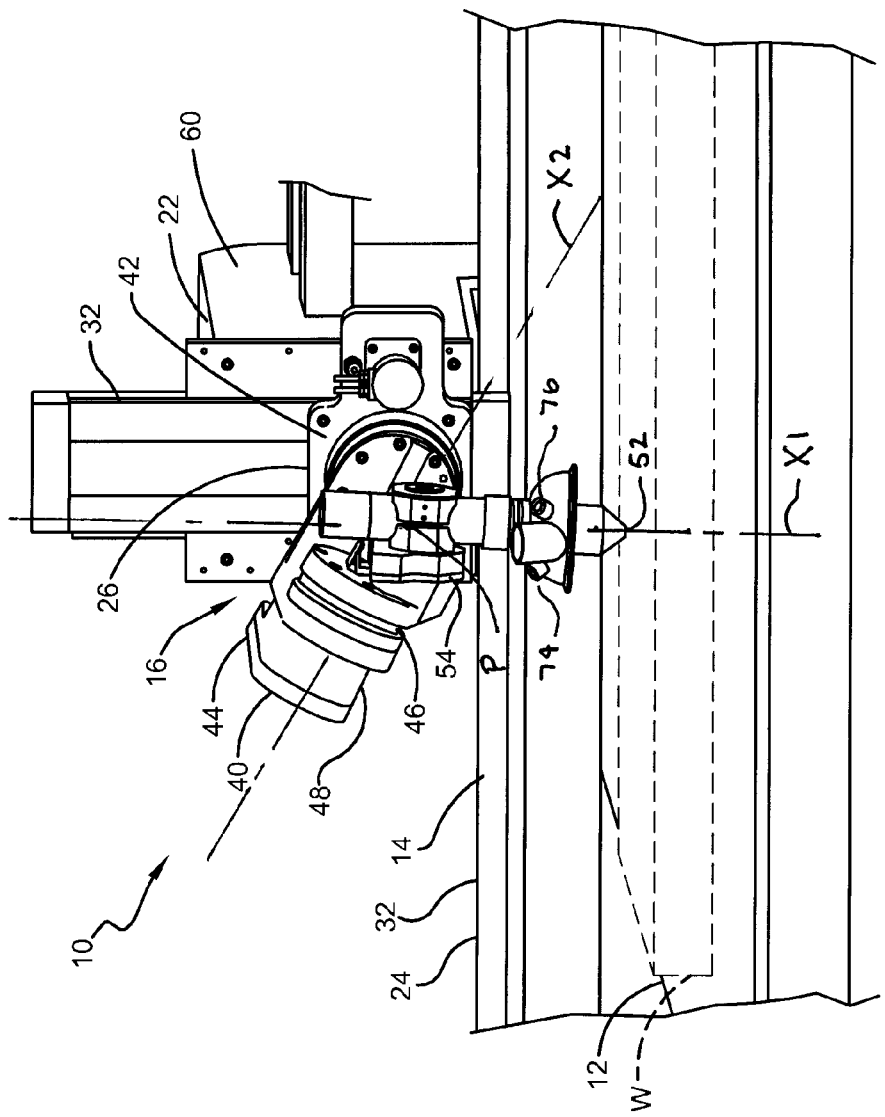
FIG. 2 is an enlarged perspective view of a portion of the plasma arc torch system of FIG. 1.
Figure 3:
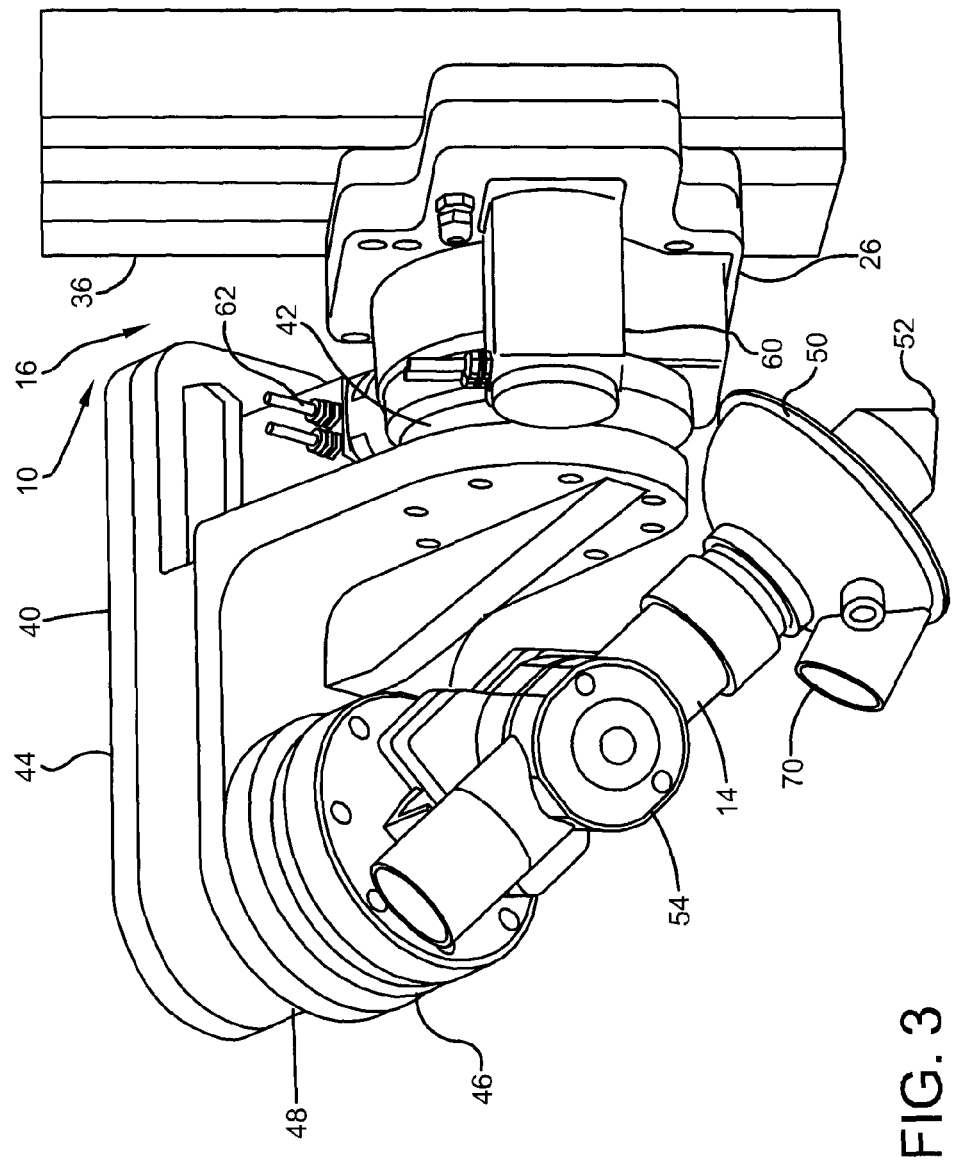
FIG. 3 is an enlarged perspective view of a portion of the plasma arc torch system of FIG. 1.

As can be better seen in FIGS. 2 and 3, a turret 40 is mounted to the carriage 26. The turret 40 permits the torch 14 to rotate about two different axes so that it can be tilted at an angle relative the mutually orthogonal X, Y, and Z-axes. The turret contains a first pivot rotary drive 42, a boom 44 extending from the first rotary drive 42, and a second rotary drive 46 on a distal end 48 of the boom 44. The plasma arc torch 14 and an exhaust shroud 50 at least partially encircling discharge tip 52 of the torch 14 are clamped in a tool holder 54 extending from the second pivot mount 46. Torch gas supply lines (not shown) extend from a port 56 on the rear end of the torch 14. Desirably, the shroud 50 is movable along the body of the torch 14 to position the shroud 50 close to the work piece 50 without bumping into the work piece W when the torch 14 is positioned at an angle such as for a beveled cut. For example, when the torch 14 is tipped at an angle relative the work piece W, the shroud 50 is moved up along the torch 14 so that the shroud 50 does not contact the work piece W. When the torch 14 is substantially vertical relative the plane of the work piece W, the shroud is lowered to maintain close proximity with the work piece W. Desirably, the shroud 50 is connected to the torch 14 such that a pneumatic actuator (not shown) may be used to raise and lower the shroud 50.

A suitable first motor, such as a first servomotor 60 coupled to a timing belt and ring gear (not shown), selectively rotates the first rotary drive 42 for positioning the torch 14. Desirably, the first servomotor 60 rotates the first rotary drive 42 about an axis parallel to the X-axis. A similar second motor such as a second servomotor 62 selectively rotates the second rotary drive 46 for positioning of the torch 14. Desirably, the second servomotor 60 rotates the second rotary drive 46 about an axis parallel to the Z-axis when the first mount is in an initial or home position. Accordingly, once an understanding of the positioning apparatus 16 is had, it should be appreciated that the torch 14 may be moved to cut a wide variety of shapes in work piece W, including circular, square, slotted and other holes. Importantly, the torch 14 may be positioned to cut beveled edges and to compensate for the angle of the side of the kerf by back burning during cutting of the work piece W or to provide a selected bevel cut where desired.

A flexible hose (not shown) is connected to a duct 70 on the exhaust shroud 50. The hose is connected to a vacuum source (not shown) such that the vacuum source creates a low-pressure area in the immediate vicinity of discharge tip 52 of torch 14. To actively collect and remove fluid debris such as noxious gases and vaporized matter produced by torch 14, the exhaust shroud 50 is used to communicate a low-pressure area in the immediate vicinity of discharge tip 52.

In operation, a user places the work piece W on the cutting table 12 and mounts the plasma arc torch 14 on the positioning apparatus 16 to provide relative motion between the tip 52 of the torch 14 and the work piece W to direct the plasma arc along a processing path. Typically, the user provides a start command to the CNC 21 to initiate the cutting process. The CNC 21 communicates with the positioning apparatus 16 to direct the motion of the torch 14 to enable the work piece W to be cut to a desired pattern. The positioning apparatus 16 uses signals from the CNC 21 to direct the torch 14 along a desired cutting path. Position information is returned from the positioning apparatus 16 to the CNC 21 to allow the CNC 21 to operate interactively with the positioning apparatus 16 to obtain an accurate cut path. The CNC 21 also controls the height of the shroud 50 on the torch 14 by controlling the pneumatic actuator.

In one embodiment, the control station 20 contains a torch height controller (THC) that provides an optimum voltage for a desired metal cutting process. As one skilled in the art will understand, there is a direct relationship between cut voltage and a standoff. The standoff refers to the gap between the surface of the work piece W and the tip 52 of the torch 14. The THC directs the mechanical slider 33 driven by the z-axis motor 34. An encoder provided inside the motor 34 is in electrical communication with the CNC 21. The encoder provides location information from the slider 33 back to the CNC 21. The torch 14 is in electrical communication with a voltage feedback card provided inside the control station 21 to provide voltage information to the CNC 21. The CNC 21 uses the location information provided by the encoder, and voltage information provided by the voltage feedback card, in conjunction with a desired work piece cut path programmed into the CNC 21, to provide an input signal to the motor 34 to change the standoff. The use on an encoder and a voltage feedback card are known in the art and need not be discussed herein in further detail.

To start the cutting process, the THC and CNC 21 direct the torch 14 until contact is made with a work piece W in three different places on the surface of the work piece W. Each time the torch 14 contacts the work piece W, a signal is sent from the voltage feedback card to the CNC 21 to indicate the position of the work piece W. The CNC 21 uses the three signals to calculate the planer surface of the work piece W. In alternate embodiments, any means for detecting the surface of the work piece W three times to calculate the planer surface may be used without departing from the scope of the invention. After the surface of the work piece W has been determined, the torch 14 is retracted to a pierce height as determined by the CNC 21. After the pilot arc in the torch 14 has transferred to a cutting arc, a signal is sent from the voltage feedback card to the CNC 21 allowing the CNC 21 to control the motion of the torch 14.

According to one embodiment of the invention, the height of the torch 14 is calibrated relative the work piece W with the work piece W on the table 12. Initially, the torch 14 is place in a substantially perpendicular orientation to the plane of the work piece W. The torch 14 is lowered with the z-axis motor 34 until contact with the work piece W is detected by a known means such as be reading the current limit on the servomotor or Ohmic sensing between the torch and work piece W. The torch 14 is then raised a determined height above the work piece W. The torch is then rotated relative the work piece a first specified angle A1 by rotating the first rotary drive 42 with the first servomotor 60. The first angle A1 is desirably between about 20 and about 60 degrees from vertical. In one embodiment, the first rotary drive 42 rotates the torch 14 a first angle A1 of 45 degrees. The torch 14 is then lowered with the z-axis motor 34 until contact with the work piece W is detected. After contact is made, the torch 14 is raised and rotated back through vertical to a second specified angle A2 relative the work piece by rotating the first rotary drive 42 with the first servomotor 60. The second angle A2 is desirably between about 20 and about 60 degrees from vertical in the opposite direction from the first angle A1. In one embodiment, the second angle A2 has the same magnitude as the first angle A1 but is in the opposite direction. With the torch 14 positioned at the second angle A2, it is lowered until contact with the work piece W is detected. The torch 14 is then raised and rotated back to a substantially vertical condition.

Next, the torch is rotated relative the work piece a third specified angle A3 by rotating the second rotary drive 46 with the second servomotor 62. The torch 14 is moved in a plane to the third angle A3 that is orthogonal to the plane in which the torch 14 was moved when positioning at the first and second angles A1 and A2. The third angle A3 is desirably between about 20 and about 60 degrees from vertical. In one embodiment, the second rotary drive 42 rotates the torch 14 a third angle A3 of 45 degrees. The torch 14 is then lowered with the z-axis motor 34 until contact with the work piece W is detected. After contact is made, the torch 14 is raised and rotated back through vertical to a fourth specified angle A4 relative the work piece by rotating the second rotary drive 46 with the second servomotor 62. The fourth angle A4 is desirably between about 20 and about 60 degrees from vertical in the opposite direction from the third angle A3. In one embodiment, the fourth angle A4 has the same magnitude as the third angle A3, but is in the opposite direction. With the torch 14 positioned at the fourth angle A4, it is lowered until contact with the work piece W is detected.

With the height of the torch 14 above the work piece W detected in the vertical position and at the four angled positions A1-A4, the distance between the tip 52 of the torch 14 and the intersection point P of the axis X1 through the center of the torch 14 and the axis X2 extending from the center of the second rotary drive 46 is calculated. This distance is used in the CNC 21 to accurately control the position and angle of the torch 14 during cutting operations. Secondly, the calibration automatically adjusts the torch 14 to be perpendicular to the work piece W.

In one embodiment of the invention, during operation of the cutting system 10, the positioning apparatus 16 orients the torch 14 relative the planer surface of the work piece W such that it has a small angle or inclination so as to compensate for uneven edge sides of the kerf that would otherwise be formed if the torch 14 were held orthogonal to the plane of the work piece W at the location being cut. Desirably, the positioning apparatus 16 adjusts the first and second pivot mounts 42, 46 on the turret 40 such that the torch 14 is held at an angle of between about 1 and about 10 degrees, and more desirably between about 1 and about 4 degrees from vertical to back burn the kerf to produce a kerf edge that is perpendicular relative the planer surface of the work piece W.

In one embodiment of the invention, the torch 14 has a cooling arrangement wherein cooling water is passed via hoses to one or more coolant chambers of the torch 14. The torch 14 houses the necessary electrical, gas and coolant conduits. The cooling water is passed to the torch 14 via an inlet hose, whereupon the coolant first circulates in a water space of the body portion of the torch and exits via an outlet hose. In one embodiment of the invention, the shroud 50 is also cooled by the closed-loop cooling system of the torch or by a separate cooling system. As best seen in FIG. 2, a cooling fluid inlet hose (not shown) is attached to an inlet port 74 on the shroud 50. A cooling fluid outlet hose (not shown) is attached to an outlet port 76 on the shroud 50. The cooling fluid cools the exhaust shroud 50.

While the disclosure has been illustrated and described in typical exemplary embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A method of calculating a planar surface of a work piece positioned on a plasma arc torch cutting system using a positioning apparatus, the method comprising:

providing a control station having a computerized numeric controller (CNC), said CNC being in electrical communication with said positioning apparatus for controlling said positioning apparatus and receiving feedback from said positioning apparatus;

providing a plasma arc torch connectable to said positioning apparatus, said positioning apparatus being controllable to provide said torch with at least five degrees of movement relative to said work piece, and wherein said torch and said control station are in electrical communication therebetween;

placing said work piece on a table of said cutting system, wherein at least a portion of said work piece has a top surface directed away from said table;

positioning said torch adjacent to said top surface of said work piece using said positioning apparatus;

contacting the work piece with the torch at three or more different locations on said top surface, wherein said torch provides said control station with a position of each of said three or more locations; and calculating a planar surface of said top surface of said work piece using said position of each of said three or more locations.

2. The method of claim 1, wherein said positions provided by said torch to said control station are x-, y-, and z-coordinates of each of said three or more locations.

3. A cutting system comprising:
a table for receiving a work piece;
a plasma arc cutting torch for cutting said work piece; and
a positioning apparatus for moving said cutting torch with respect to said work piece, wherein said positioning apparatus provides said cutting torch with five degrees of movement relative said work piece, said positioning apparatus comprising:
   a gantry with a traveling beam operatively connected to said table;
   a carriage operatively connected to said traveling beam;
   a first rotary drive rotatably connected to said carriage;
   a boom having a first distal end attached to said first rotary drive;
   a second rotary drive attached to a second distal end of said boom; and
   wherein said cutting torch extends from said second rotary drive;
a control station operatively connected to said positioning apparatus and said cutting torch, wherein said control station is in electronic communication with said positioning apparatus to direct said positioning apparatus to move said cutting torch relative to said work piece to calculate a planar top surface of said work piece by directing said cutting torch to contact said top surface at three or more locations.

4. The cutting system of claim 3, wherein said traveling beam is movable by an X-axis motor along a first axis, and said carriage is movable along a second axis by operation of a Y-axis motor, and said carriage is movable by operation of a mechanical slider connected to a Z-axis motor for movement along a third axis which extends in a vertical direction relative to said table, wherein said first, second and third axes are mutually orthogonal.

5. The cutting system of claim 3, wherein said first and second rotary drives permit said cutting torch to rotate about two different axes so that said cutting torch can be tilted at an angle relative to said first, second and third axes.

6. The cutting system of claim 3, wherein said boom is rotatably drivable by said first rotary drive about a first axis, wherein rotation of said boom relative to said carriage provides a first degree of movement for said cutting torch relative to said table.

7. The cutting system of claim 6, wherein said cutting torch is rotatably drivable by said second rotary drive about a second axis, wherein rotation of said cutting torch relative to said boom provides a second degree of movement for said cutting torch relative to said table.

8. The cutting system of claim 3, wherein said traveling beam is horizontally translatable relative to said table to provide a first degree of movement for said cutting torch relative to said table.

9. The cutting system of claim 8, wherein said carriage is horizontally translatable relative to said table to provide a second degree of movement for said cutting torch relative to said table, wherein said second degree of movement is perpendicular to said first degree of movement.

10. The cutting system of claim 9, wherein said carriage is vertically translatable relative to said table to provide a third degree of movement for said cutting torch relative to said table, wherein said third degree of movement is perpendicular to a plane defined by said first and second degrees of movement.

11. The cutting system of claim 3, wherein said cutting torch is rotatable by said first rotary drive between 0-60° in each direction from a home position about a first axis, and said cutting torch is rotatable by said second rotary drive between 0-60° in each direction from a home position about a second axis.

12. A cutting system comprising:
a table for receiving a work piece;
a plasma arc cutting torch for cutting said work piece; and
a positioning apparatus for moving said cutting torch with respect to said work piece, wherein said positioning apparatus provides said cutting torch with five degrees of movement relative said work piece, said positioning apparatus comprising:
   a gantry with a travelling beam operatively connected to said table, wherein said travelling beam is movable along an x-axis relative to said work piece to provide a first degree of movement relative to said work piece;
   a carriage operatively connected to said traveling beam, said carriage is movable in a y-axis and a z-axis relative to said work piece to provide a second degree of movement and a third degree of movement relative to said work piece;
   a turret attached to said carriage, said cutting torch being attached to said turret, wherein said turret is movable relative to said work piece to provide a fourth degree of movement and a fifth degree of movement relative to said work piece.

13. The cutting system of claim 12, wherein said turret including a first rotary drive, a boom having a first distal end attached to said first rotary drive, and a second rotary drive attached to a second distal end of said boom, wherein said cutting torch extends from said second rotary drive, said first rotary drive being connected to said carriage and said cutting torch being connected to said second rotary drive.

14. The cutting system of claim 13, wherein said boom is rotatably drivable by said first rotary drive about a first axis, wherein rotation of said boom relative to said carriage provides said fourth degree of movement for said cutting torch relative to said work piece.

15. The cutting system of claim 14, wherein said cutting torch is rotatably drivable by said second rotary drive about a second axis, wherein rotation of said cutting torch relative to said boom provides said fifth degree of movement for said cutting torch relative to said work piece.

* * * * *